United States Patent
Cruz-Uribe et al.

(10) Patent No.: US 7,625,512 B2
(45) Date of Patent: Dec. 1, 2009

(54) METHOD AND A SYSTEM FOR PRODUCING AN OBJECT USING SOLID FREEFORM FABRICATION

(75) Inventors: Antonio S. Cruz-Uribe, Corvallis, OR (US); David C Collins, Philomath, OR (US); Jeffrey Allen Nielsen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1247 days.

(21) Appl. No.: 10/620,860

(22) Filed: Jul. 15, 2003

(65) Prior Publication Data

US 2005/0015171 A1 Jan. 20, 2005

(51) Int. Cl.
*B29C 41/02* (2006.01)
(52) U.S. Cl. .................................. 264/308; 264/317
(58) Field of Classification Search ............. 264/113, 264/236, 308, 317, 401, 408, 497; 427/356, 427/358, 359
See application file for complete search history.

(56) References Cited

U.S. PATENT DOCUMENTS

| 5,136,515 | A | 8/1992 | Helinski |
| 6,364,986 | B1 * | 4/2002 | Kieronski ............... 264/401 X |
| 2002/0094401 | A1 | 7/2002 | Kieronski |

FOREIGN PATENT DOCUMENTS

| DE | 195 37 264 A1 | 4/1997 |
| DE | 199 03 436 A1 | 8/2000 |
| JP | 06143438 | 5/1994 |
| WO | 03026031 | 3/2003 |
| WO | WO 03/027960 A2 | 4/2003 |

OTHER PUBLICATIONS

Translation of DE 19537264 A1 (published on Apr. 10, 1997).*

* cited by examiner

*Primary Examiner*—Leo B Tentoni

(57) ABSTRACT

A method of producing an object through solid freeform fabrication includes selectively depositing a boundary structure that defines a surface of the object, and depositing a flowable build material within the boundary structure, wherein the flowable build material forms a portion of the object by flowing to the boundary structure.

1 Claim, 9 Drawing Sheets

METHOD AND A SYSTEM FOR PRODUCING AN OBJECT USING SOLID FREEFORM FABRICATION

BACKGROUND

Solid freeform fabrication is a process for manufacturing three-dimensional objects. Typical objects that may be manufactured using solid free form fabrication include, for example, prototype parts, production parts, models, and working tools. Solid freeform fabrication is an additive process in which a desired object is described by electronic data and automatically built from base materials. Selective deposition is one common method of solid freeform fabrication.

Typical selective deposition methods include using a dispensing mechanism to deposit, at particular locations, individual drops of material known as voxels. A selective deposition system typically incorporates two different solidifiable materials. A first material is used to fabricate the actual desired three-dimensional object, and a second material is a sacrificial material used to build a support structure for the first material.

Several variations of selective deposition exist. One variation includes depositing two materials (one for support and one for the desired three-dimensional object) that solidify upon application. This variation of the selective deposition method requires object build material to be dispensed at each voxel location corresponding to a part of the desired three-dimensional object. Accordingly, physical defects result when the dispensing mechanism has missing or misdirected nozzles.

Another common variation of selective deposition includes depositing at least two materials (support and object) that both remain in liquid form until they are exposed to radiation (e.g. ultraviolet "UV" light). This second variation also presents a number of issues. First, interfaces between support and build materials are not well defined as the liquids tend to mix. This mixing between the two materials results in rough object surfaces. Second, the support material is usually solidified and cross-linked making it difficult to remove from the desired three-dimensional object without damaging the desired object. Further, as with the first variation, the build material must be dispensed at each voxel location of the desired object, slowing the fabrication process.

SUMMARY

A method of producing an object through solid freeform fabrication includes selectively depositing a boundary structure that defines a surface of the object, and depositing a flowable build material within the boundary structure, wherein the flowable build material forms a portion of the object by flowing to the boundary structure.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and apparatus for creating objects with a solid freeform fabrication system through selective boundary deposition is described herein. More specifically, a method is described for forming a boundary structure using a high precision process while depositing a flowable build material using a low precision process.

As used in this specification and in the appended claims, the term "high precision dispenser" is meant to be understood broadly as any dispensing equipment configured to perform a high precision process. Alternatively, the term "low precision dispenser" refers to dispensing equipment that is configured to eject material according to a low precision process and may, under some circumstances, eject a continuous flow. Moreover, a single material dispenser may be configured to selectively operate as both a high precision dispenser and a low precision dispenser. "Flow" or "continuous flow" is meant to be understood broadly to include a fluid stream that is not defined by individual drops or bubbles but is not necessarily completely uninterrupted. Further, an "outer surface" of an object is meant to be understood both here and in the appended claims to include all surface contours of an object. However, an "outer surface" may alternatively include all surfaces of an object other than top and bottom surfaces. The term "voxel" describes a volumetric pixel of an addressable volume having length in x, y, and z coordinates. Additionally, the term "sparse" is meant to be understood as widely spaced, scattered, or otherwise not densely packed. The term "cure" refers to a process of solidification that may also impart a degree of chemical resistance to an object being cured. The term "solidify" is meant to be understood as any process for adding a degree of structural strength or hardness to a material while not necessarily permanently setting the state of the material.

In the following description, for purposes of explanation, numerous specific details are set forth in order to provide a thorough understanding of the present solid freeform fabrication method. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
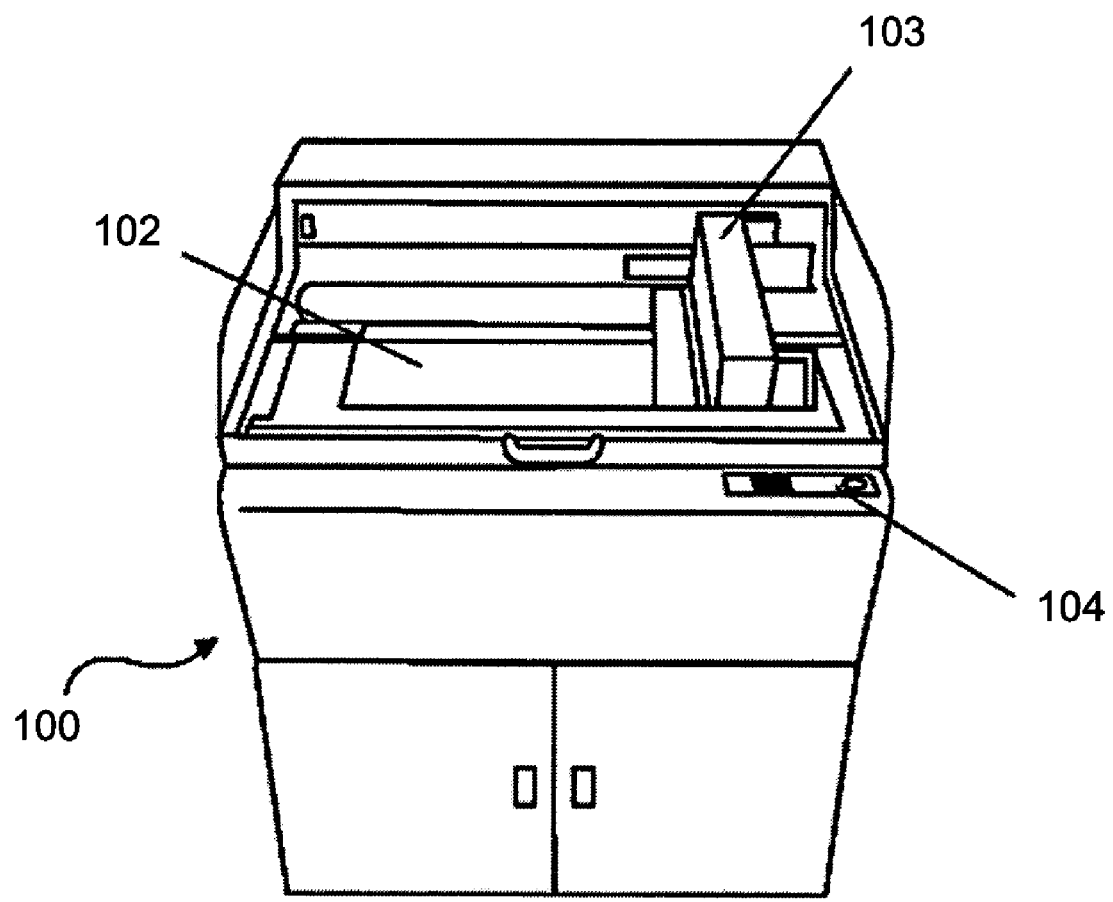
FIG. 1 is a perspective view of a solid freeform fabrication system that may be used to implement exemplary embodiments of the present system and method.

Referring now to FIG. 1, a solid freeform fabrication system (100) that may incorporate the present freeform fabrication method is illustrated. As shown in FIG. 1, a solid freeform fabrication system may include a fabrication bin (102), a moveable stage (103), and a display panel (104) including a number of controls and displays.

The fabrication bin (102) shown in FIG. 1 is configured to receive and facilitate the building of a desired three-dimensional object on a substrate. The fabrication bin (102) may also receive a containment structure configured to receive and support the above-mentioned build material. The containment structure may be formed within the fabrication bin (102) either prior to or simultaneously with the desired three-dimensional object. While the solid freeform fabrication system (100) illustrated in FIG. 1 is shown as a single, standalone, self-contained freeform fabrication system, the present freeform fabrication methods may be incorporated into any freeform fabrication system regardless of structure or configuration.

Figure 2:
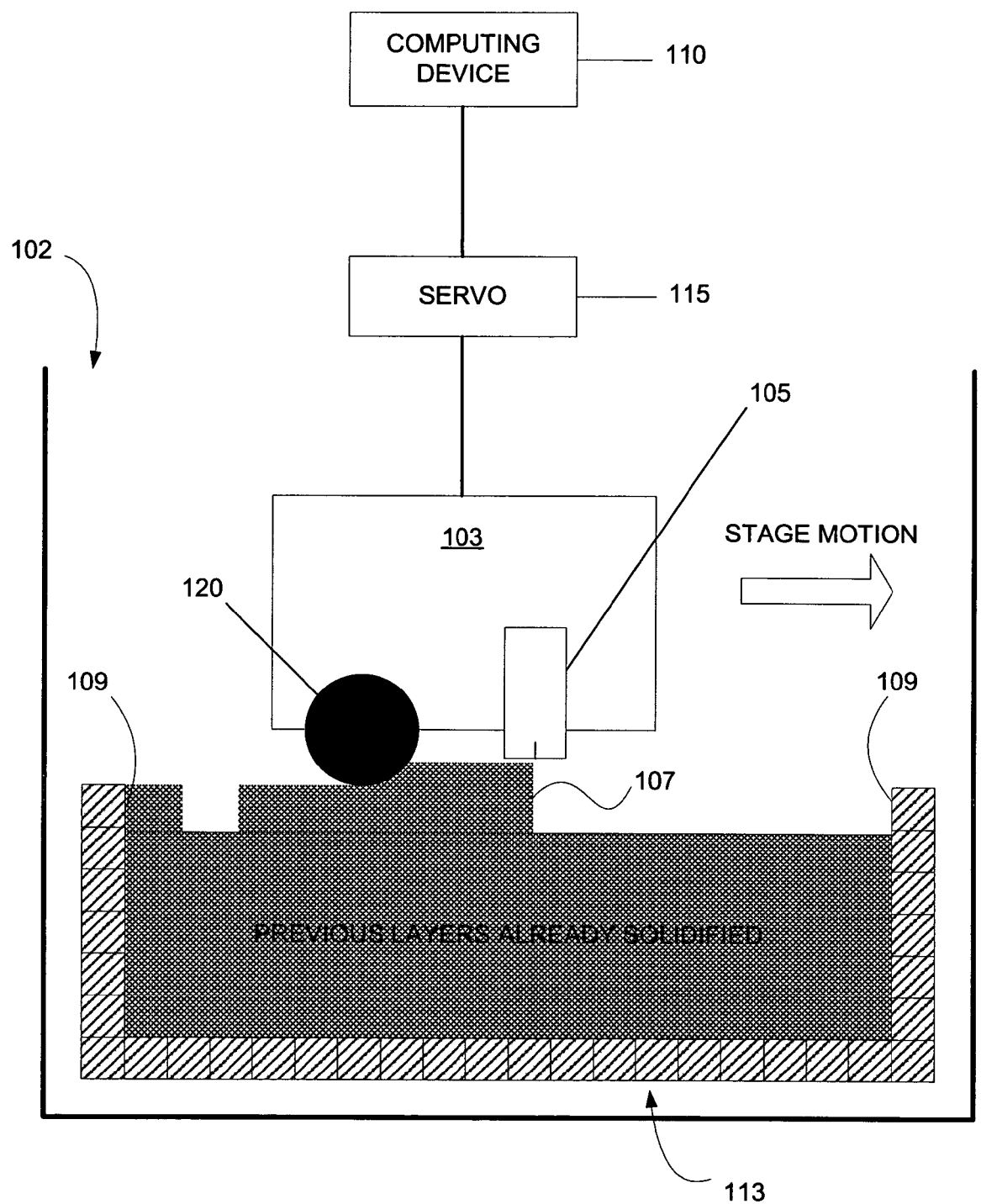
FIG. 2 is a schematic view illustrating the components of a solid freeform fabrication system according to one exemplary embodiment.

The moveable stage (103) illustrated in FIG. 1 is a moveable material dispenser that may include dispensers configured to operate as high precision and/or low precision dispensers. The dispensers (not shown) of the moveable stage may include, but are in no way limited to, one or more print heads or syringes. The moveable stage (103) may be controlled by a computing device (110; FIG. 2) and may be controllably moved by, for example, a shaft system, a belt system, a chain system, etc. As the moveable stage (103) operates, the display panel (104) may inform a user of operating conditions as well as provide the user with a user interface.

FIG. 2 illustrates the association between the components of a solid freeform fabrication system and a desired three-dimensional object. As shown in FIG. 2, the solid freeform fabrication system may include a computing device (110), servo mechanisms (115), and a moveable stage (103) including, among other components, a roller (120) and a number of material dispensers (105) such as a print head capable of selectively operating either as a high precision dispenser or as a low precision dispenser. As shown in FIG. 2, the computing device (110) may be communicatively coupled to the servo mechanisms (115) which are then coupled to the moveable stage (103). The computing device (110) may be any device configured to translate coordinates representing a segment of a desired three-dimensional object and its necessary structural support into suitable servo commands for the servo mechanisms (115). The servo mechanisms (115) may then respond to the commands issued by the computing device (110) and position the moveable stage such that it may deposit build and/or structural material to form the segment. The components of the moveable stage (103) are positioned such that they may deposit build and/or structural material inside the fabrication bin (102) at x, y, and z coordinates designated by the computing device (110). Additionally, the fabrication bin (102) may be moveable in order to position the deposition of build and/or structural material.

The material dispensers (105) illustrated in FIG. 2 may be a single print head containing multiple orifices (at least one orifice for dispensing build material, and another for dispensing support material) or multiple material dispensers of the same or different types (at least one dispenser for dispensing build material, and another for dispensing support material). The material dispensers may be configured to perform selective boundary deposition when forming the boundary (109) of a containment structure (113) according to high precision methods, and dispense object build material (107) and non-boundary structural material according to low precision dispensing methods. The term selective deposition is meant to be understood both here and in the appended claims as a method whereby the material dispensers (105) selectively deposit structural material that makes up the object forming boundary (109) using high precision dispensing methods including, but in no way limited to, allowing a minimal distance between the material dispensers (105) and a target area, incorporating a low material drop rate and frequency, implementing a low carriage speed, receiving a high resolution data set, or any appropriate combination thereof. Since only the object forming boundary (109) will be in contact with the object build material, only the immediate object forming boundary (109) need be formed according to high precision dispensing methods. The remaining support material, as well as the object build material (107), may be dispensed according to typically faster, low precision methods. The level of precision exhibited by the material dispensers (105) may depend on a number of factors including, but in no way limited to, distance between the material dispensers (105) and a target area, material drop rate used by the material dispensers (105), frequency, firing method incorporated, quality of feedback mechanism, carriage speed, resolution of data set, etc. Additionally, a material dispenser operating as a low precision dispenser may cause fluid to be deposited inaccurately in a target area or have misfiring or missing dispensing components.

The roller (120) illustrated in FIG. 2 may be configured to level or planarize material after the material has been dispensed. Planarization is meant to be understood broadly both here and in the appended claims to mean any operation that may be performed on a deposited material that removes excess material, consolidates deposited material, and/or improves the surface finish of the material. According to the present method, the planarization may occur following the dispensing of the containment structure and/or following the dispensing of the volume of object build material into a containment structure (113). The roller (120) may follow the print head (105) to planarize dispensed object build material (107) and create a generally uniform thickness in the build material. The planarization may be performed by a roller (120) as shown in FIG. 2, by a device that contains a doctor blade (not shown), or any other device configured to remove excess material from a cavity thereby producing a precise fill with minimal defects. Additionally, the object build material (107) may be permitted to naturally migrate and spread to the object defining boundary (109) of a containment structure (113). The natural migration and spreading of the object build material (107) may be controlled by a number of factors including, but in no way limited to, the force of gravity on the object build material (107), the viscosity of the object build material, the surface tension of the object build material, surface energy of the object build material, and the wetting properties of the object build material.

The object defining boundary (109) of the containment structure (113) illustrated in FIG. 2 may be constructed by a material dispenser (105) operating as a high precision dispenser located on the moveable stage (103). The material dispenser (105) operating as a high precision dispenser may include, but is in no way limited to, one or more print heads incorporated into a movable carriage assembly. The containment structure (113) shown in FIG. 2 may be formed by the high precision selective deposition of support material voxels in specified locations. The voxels may be stacked in vertical stacks of multiple voxels, or linearly placed to define the outer surface of a portion of the desired three-dimensional object. The containment structure (113) may be composed of any material capable of being ejected from a material dispenser operating as a high precision dispenser while providing surface definition to object build material including, but in no way limited to polymers, wax, or other similar meltable materials or appropriate combinations thereof.

The desired three-dimensional object that is formed within the containment structure (113) may be built from an object build material (107) as shown in FIG. 2. The object build material may be any solidifiable material capable of being formed within, and assuming the shape of a containment structure (113) after being dispensed by one or more of the material dispensers (105) including, but in no way limited to, a polymer or a wax. To build each segment of the desired three-dimensional object, a quantity of the object build material (107) may be provided from one of the material dispensers (105) operating as a low precision dispenser. The material dispenser (105) operating as a low precision dispenser may include an inkjet print head, a piezoelectric print head, a thermal inkjet print head, a continuous jet print head, a valve jet print head, a syringe mechanism, or any other dispenser capable of dispensing a specified quantity of build material (107) upon request from the computing device (110). While traditional selective deposition solid freeform fabrication systems require a voxel of object build material (107) to be dispensed at each location of the desired three-dimensional object, the present system and method allow a volume of build material (107) to be administered in bulk liquid form. The liquid build material may then be permitted to flow and subsequently fill the containment structure (113). As long as the object build material (107) is applied to the interior of the containment structure (113), there may be multiple ejection locations, or as few as one single ejection location for the object build material according to principles described herein.

Figure 3:
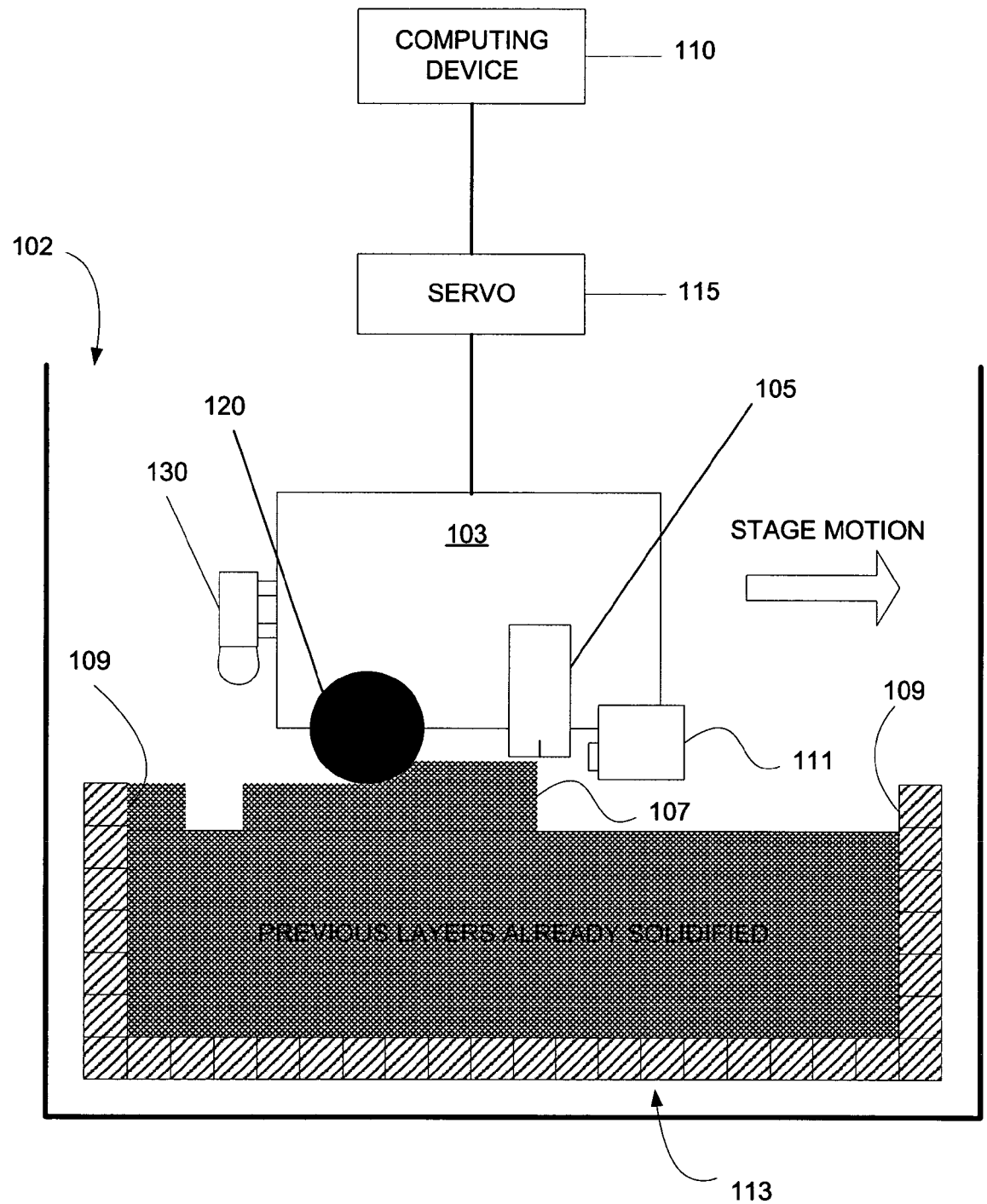
FIG. 3 is a schematic view illustrating the components of a solid freeform fabrication system according to an additional exemplary embodiment.

FIG. 3 illustrates an additional exemplary configuration that may be used to incorporate the present freeform fabrication methods. The structure illustrated in FIG. 3 shows a computing device (110), servo mechanisms (115), and a moveable stage (103) including material dispensers (105) and a roller (120) similar to the structure illustrated in FIG. 2. However, FIG. 3 also includes a feedback device (111) configured to monitor and control the dispensing of the volume of object build material (107) and a radiation applicator (130) configured to apply radiation to the dispensed material after the deposition of each segment. The feedback device (111) may include, but is in no way limited to, an optical sensor, a flow meter, or other device that may be used to monitor and control the volume of object build material (107) dispensed by the material dispenser (105) operating as either a high precision or a low precision dispenser. Additionally, the radiation applicator (130) may be any device configured to apply ultraviolet (UV) or other radiation sufficient to solidify or cure deposited material. As shown in FIG. 3, the radiation applicator (130) may be coupled to the moveable stage (103) as a scanning unit. Alternatively, the radiation applicator (130) may be a separate light exposer or scanning unit configured to flood expose all or selective portions of deposited material after a segment of build material has been deposited.

Returning again to FIG. 2, the movable stage (103) of the solid freeform fabrication system (100; FIG. 1) may include inkjet technology, such as continuous or drop-on-demand liquid ejection devices including thermal and/or piezoelectric inkjets, for depositing the containment structure (113) and/or object material (107). Additionally, the moving stage may include additional components configured to form or color the desired three-dimensional object. If the moving stage (103) incorporates continuous or drop-on-demand inkjet technology, the moving stage may include one or more material dispensers (105) such as print heads configured to eject materials, clear or colored, in a selective pattern to add color or texture to the object or the support structure being fabricated.

As discussed above, the material dispensers (105) may be configured to selectively function as a high precision printhead for performing selective boundary deposition when forming the object defining boundary (109) of the containment structure (113). However, rather than requiring the material dispensers (105) to continually function as a temporally expensive, high precision dispenser, the material dispensers (105) may also selectively operate as a low precision dispenser when dispensing build material (107) or non-boundary support material for the selectively deposited containment structure (113). When depositing build material (107), the material dispensers (105) may eject bulk amounts of object build material (107) within the boundaries of the selectively deposited containment structure (113). Accordingly, the three-dimensional objects built according to the principles described herein may be built more quickly and cheaply than previous solid freeform fabrication systems that require material ejection by high precision methods at each voxel of a desired three-dimensional object.

Exemplary Implementation and Operation

Figure 4:
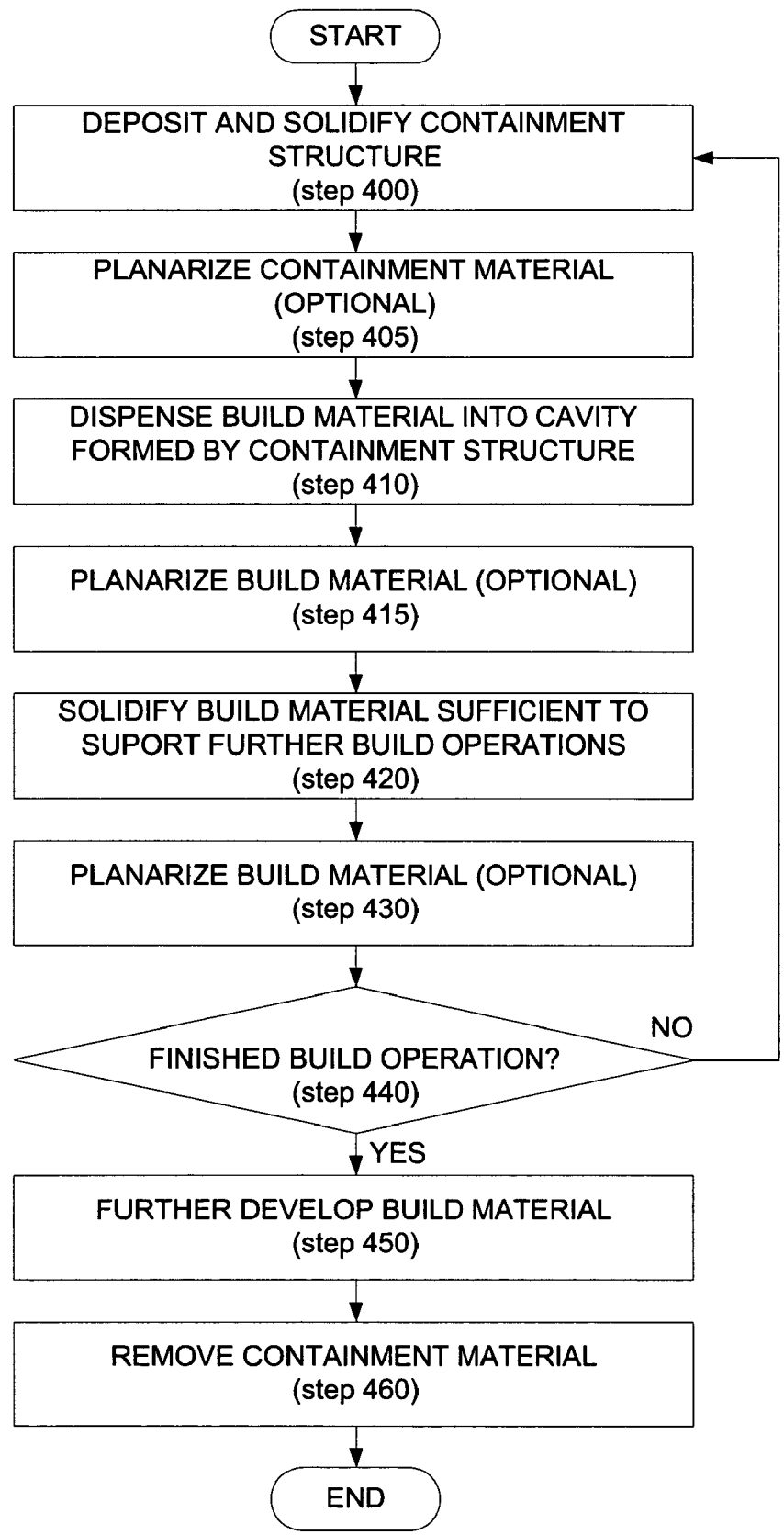
FIG. 4 is a flow chart illustrating a method for forming a desired three-dimensional object by solid freeform fabrication according to one exemplary embodiment.

FIG. 4 is a flow chart illustrating the present solid freeform fabrication method according to one exemplary embodiment. As illustrated in FIG. 4, the present method may begin by depositing and solidifying a containment structure (step 400). Once a portion of the containment structure has been deposited and optionally planarized (step 405), the solid freeform fabrication system (100; FIG. 1) may dispense build material using a dispenser operating as a low precision dispenser into a containment moat formed by the containment structure (step 410). The build material may then be solidified (step 420). An optional planarization of the build material may also occur either before (step 415) or after (step 430) the solidification of the build material (step 420). If the process of building the desired three-dimensional object is not yet complete (NO, step 440), the solid freeform fabrication system (100; FIG. 1) returns to step 400 and again deposits and solidifies a containment structure. If, however, the process of building the desired three-dimensional object is completed, (YES, step 440), the solid freeform fabrication system (100; FIG. 1) may further develop the build material (step 450) and remove the containment material (step 460). Each of the above-mentioned steps will now be explained in detail with reference to FIGS. 5 through 7.

As shown in FIG. 4, the present method begins by depositing and solidifying a containment structure (step 400). The containment structure (113; FIG. 2) may be formed out of a material deposited by a material dispenser including, but in no way limited to, melted wax, a polymer, or any other compound that is readily jetted to defined locations. Once the containment structure material is deposited in a designated location, the containment material may solidify through cooling or a rapid chemical curing process activated by chemical agents present in the containment material.

The object forming boundary (109; FIG. 2) of the containment structure (113; FIG. 2) forms the surface that defines the walls, the base, and/or the top (if vertical nesting is required) of the desired three-dimensional object. The containment material may be linearly placed or deposited as a number of voxels vertically stacked on one another forming a number of perimeter structures that may be connected to define the outer surface of a segment of the desired three-dimensional object. Additionally, the containment structure may be one or multiple segments thick. Since the object forming boundary (109; FIG. 2) of the containment structure (113; FIG. 2) is the only portion of the containment structure that affects the surface of the desired three-dimensional object, it is the only portion of the containment structure that needs to be formed through selective boundary deposition using a material dispenser operating as a high precision dispenser. Once the object forming boundary (109; FIG. 2) has been formed, the remainder of the containment structure (113; FIG. 2) may be formed by one of the material dispensers (105) operating as a low precision dispenser. As shown in FIG. 4, any defects or voids present in the containment structure (113; FIG. 2) may be removed from the containment structure through an optional planarization process (step 405).

Figure 5A:
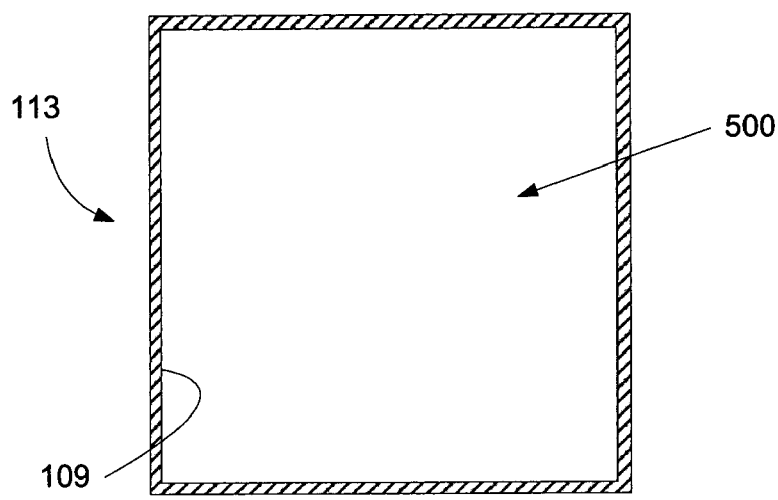
FIGS. 5A and 5B are top views of a build bin of the solid freeform fabrication system of FIG. 1 illustrating an alternative containment structure and object build material according to exemplary embodiments.

FIG. 5A illustrates a containment structure (113) according to one exemplary embodiment. As illustrated in FIG. 5A, the containment structure (113) may be formed having a continuous object forming boundary (109) that will define the surface of the desired three-dimensional object. As shown in FIG. 5A, the inner wall (109) of the boundary is substantially continuous because it will interact with the build material to form the surface finish of the desired three-dimensional object. Moreover, the inner wall (109) of the containment structure (113) defines a containment moat (500) configured to receive and support build material that will form the desired three-dimensional object.

Figure 5B:
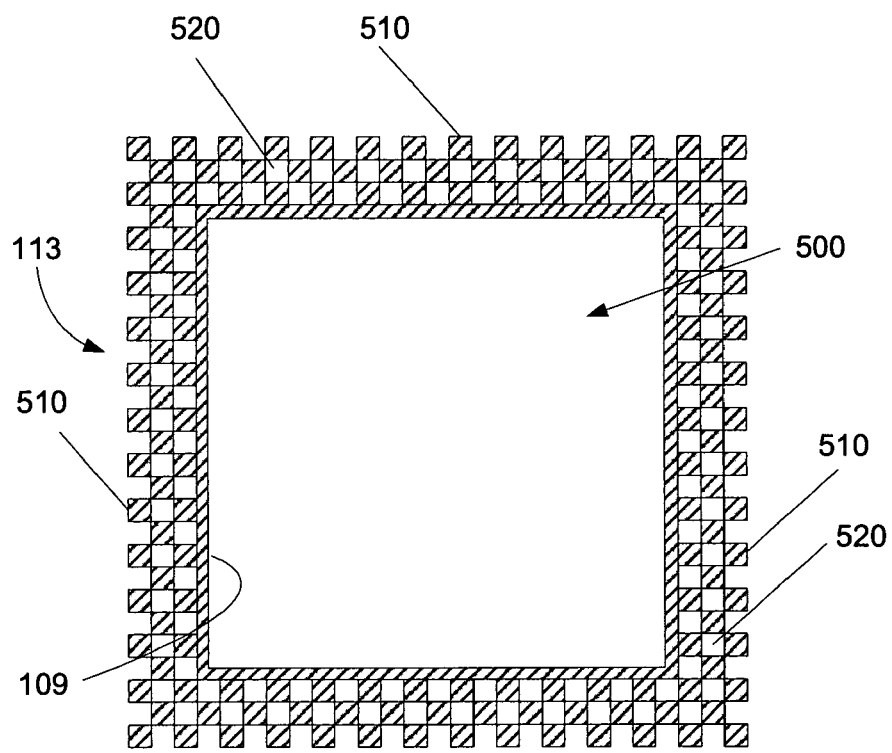

FIG. 5B illustrates how structural material used to form the containment structure (113) may be reduced according to the present solid freeform fabrication method. As shown in FIG. 5B, once the continuous object forming boundary (109) has been formed through selective boundary deposition, a structural support may be deposited in a sparse array structure by a material dispenser operating as a low precision dispenser. The continuous object forming boundary (109) is necessary to define the surface of the desired three-dimensional object by containing any build material deposited therein. However, the continuous object forming boundary (109) may be formed so thin that it may lack structural strength. In order to add structural strength to the continuous object forming boundary (109) while reducing material use, a sparse array structure may be deposited. As shown in FIG. 5B, the sparse array structure beyond the continuous object forming boundary (109) may include a number of voids (520) defined by sparsely located areas of structural material (510). The sparse array structure may be made of either structural material, build material, or any other desirable material that may be dispensed by a low-precision dispenser to add structural support to the object forming boundary (109). The incorporation of a sparse array structure is possible once the continuous object forming boundary (109) is complete because the sparse array structure does not come into contact with the build material that forms the outer surface of the desired three-dimensional object. This sparse array structure not only reduces the amount and cost of structural material needed to form a structurally viable containment structure (113), the reduction in structural material also reduces the processing time required to remove the structural material from the desired three-dimensional object after fabrication. Moreover, the sparsely located areas of material may be deposited using a material dispenser operating as a low precision dispenser since voxel placement is not as important outside of the continuous object forming boundary (109).

Figure 6A:
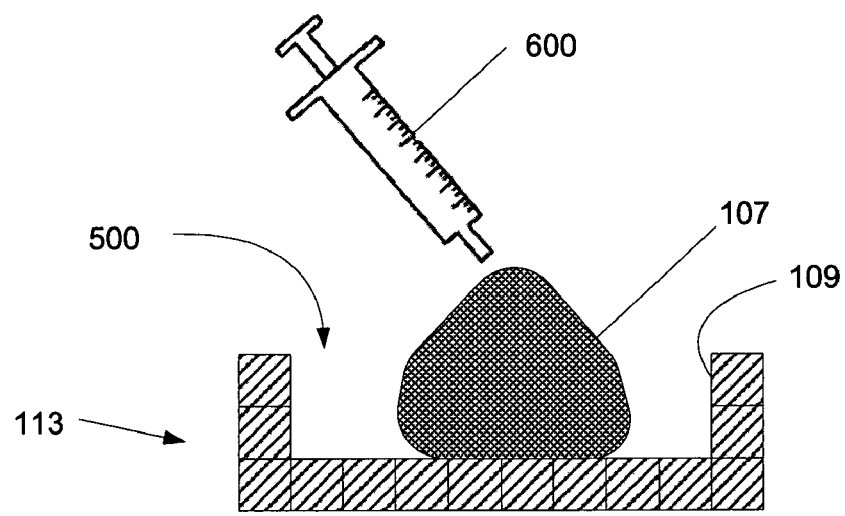
FIG. 6A is a side view of a build bin of a solid freeform fabrication system of FIG. 1 illustrating application of object build material within a containment structure according to one exemplary embodiment.
Figure 6B:
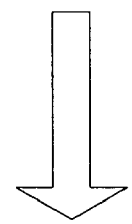
FIG. 6B is a side view of the build bin of FIG. 6A, after the passage of time.
Figure 6B:
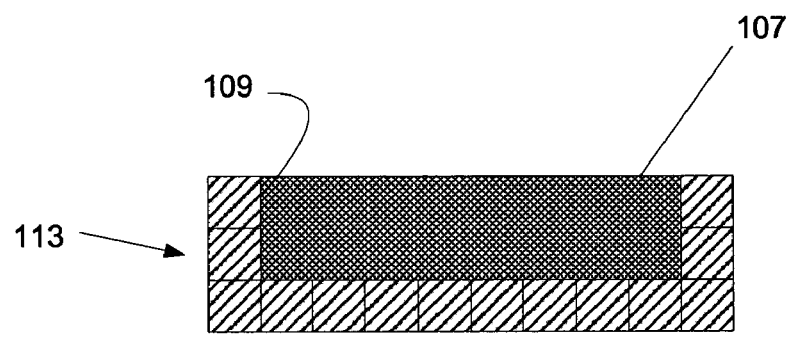

Once the containment structure (113) is sufficiently dispensed and/or solidified to support build material, the present solid freeform fabrication system (100; FIG. 1) may dispense build material (107; FIG. 6A) into the containment moat (500; FIG. 6A) formed by the continuous object forming boundary (109; FIG. 6A) of the containment structure (113) as shown in FIG. 6A. The build material (107) may be dispensed by any number of material dispensers operating as a low precision dispenser including, but in no way limited to, an inkjet print head, a piezoelectric print head, a thermal inkjet print head, a continuous jet print head, a valve jet print head, or a syringe mechanism. FIG. 6A illustrates a syringe (600) dispensing a predetermined volume of build material (107) into the containment moat (500) created by the continuous object forming boundary (109) of the containment structure (113). Once the build material (107) has been deposited within the containment structure (113), the liquid build material, after a viscosity, surface tension, gravity, and wetting controlled period of time (represented by arrow), may settle against the continuous object forming boundary (109) of the containment structure (113) as shown in FIG. 6B.

Figure 7A:
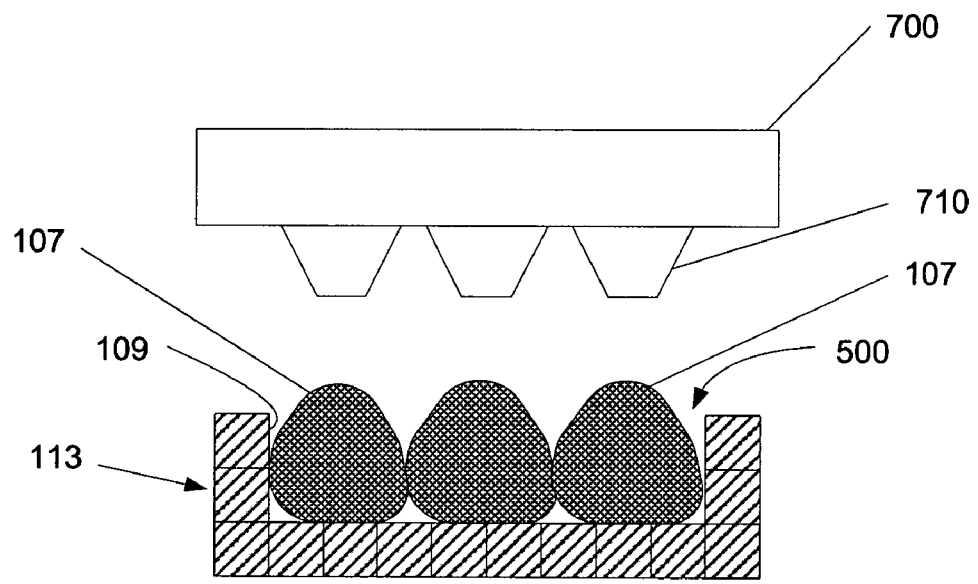
FIG. 7A is a side view of another build bin of a solid freeform fabrication system illustrating application of object build material in multiple locations within a containment structure according to another exemplary embodiment.
Figure 7B:
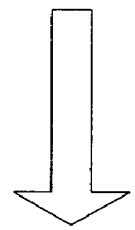
FIG. 7B is a side view of the build bin of FIG. 7A, after the passage of time.
Figure 7B:
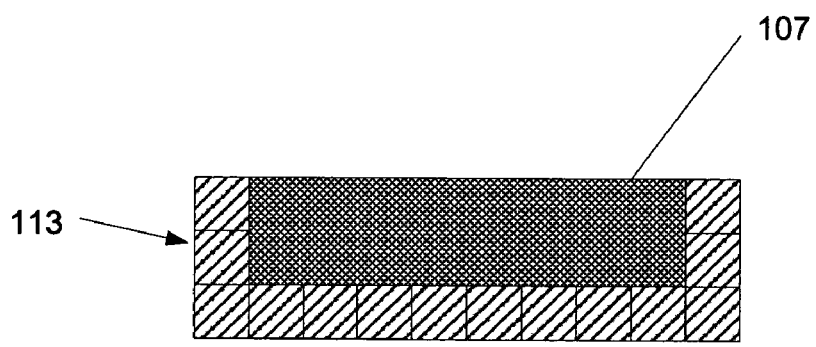

FIG. 7A illustrates how multiple material dispensers (700) may be used to dispense a predetermined volume of build material (107) into the containment moat (500) created by the continuous object forming boundary (109) of a containment structure (113). As shown in FIGS. 7A and 7B, material dispensers (700) such as inkjet print heads may dispense multiple groups of build material (107) which, with the passage of time (arrow), may settle against the continuous object forming boundary (109) of the containment structure (113). The use of multiple build material dispensers (700) may reduce the time necessary for the build material (507) to spread across and fill the containment moat (500). If an exact fill is desired, a squeegee or roller type mechanism such as that illustrated in FIG. 3 may be employed to remove any excess build material (107) that may be deposited in the containment moat (500) while still in liquid form (step 415; FIG. 4). It may be noted that the build material (107) and the containment structure (113) may both be planarized simultaneously by step 415. Moreover, the volume of build material (107) dispensed by the material dispensers (700) may be monitored and precisely controlled using an optical sensor or other feedback device (111; FIG. 3). Regardless of the type of dispenser used, the cost and the time necessary to perform the solid freeform fabrication may be reduced according to the present method because solidification of the build material is not required upon contact. Rather, by forming the continuous object forming boundary (109) using a material dispenser operating as a high precision dispenser, the build material may be dispensed with a low precision dispenser and allowed to settle prior to solidification. The ability to flow also allows the build material to eliminate structural cavities and defects typical of many solid freeform fabrication systems.

Once the build material has been deposited and processed sufficiently to reduce the likelihood of defects (step 415), the solid freeform fabrication system (100; FIG. 1) may solidify the build material (107; FIG. 7B). The contained liquid build material (107; FIG. 7B) may be solidified using any appropriate means including, but in no way limited to, partial curing by electromagnetic radiation, the application of heat, or a chemical cure activated by chemical agents present in the build material when deposited (step 420). The solidification of the liquid build material (107; FIG. 7B) may either occur immediately after a quantity of liquid build material has been dispensed within a containment moat or upon the formation of multiple segments of build material. The build material may be solidified through partial curing, such that the partially cured segments of build material will support subsequently deposited build material. By partially curing the deposited material rather than completely curing each segment upon deposition, intermediate solidification time is reduced along with overall process time. With the build material (107; FIG. 7B) solidified, the build material may again optionally be planarized (step 430). Planarization at this point in the process helps to assure precise fill of the containment moat (500; FIG. 7A) by removing any build material that exceeds the height or thickness of the containment structure (113; FIG. 7A). Moreover, planarization after the partial solidification of the build material may eliminate a number of defects such as bubbles in the build material.

Once the build material has been planarized (step 430), the computing device (110; FIG. 2) determines whether the building of the desired three-dimensional object is complete (step 440). If the computing device (110; FIG. 2) determines that the building of the desired three-dimensional object is not complete and additional quantities of containment structure and build material should be formed to complete the desired three-dimensional object (NO, step 440), then the computing device may cause the solid freeform fabrication system (100; FIG. 1) to begin again with step 400. If, however, the computing device determines that the building of the three-dimensional object is complete (YES, step 440), the solid freeform fabrication system (100; FIG. 1) may further develop the build material (step 450). Further developing of the build material (107; FIG. 7B) may be required upon completion of the material dispensing because, as explained above, the build material may only be solidified sufficiently during the build process to support subsequent quantities of build material. The further development of the build material (step 450) may occur by any number of curing means including, but in no way limited to, the application of electromagnetic radiation, UV radiation, heat, or a chemical cure activated by chemical agents present in the build material when deposited.

Once cured, the containment material may be removed from the desired three-dimensional object (step 460). The process used to remove the containment material may vary depending on the materials used. If both the containment material and the build material are made of wax, the build wax may have a higher melting point than that of the containment wax. According to this exemplary embodiment, the composite structure of both the containment material and the desired three-dimensional object may be immersed in a solution that has been heated to a temperature above the melting point of the containment material wax, but below that of the build material wax. The heat from the solution may cause the containment material wax to melt from the desired three-dimensional object. Similarly, if the build material is a curable material that may be cured with exposure to radiation and the containment material is a wax, the containment wax may be heated up and melted off of the build material without having to keep the operating temperature between the melting point of the containment material and the melting point of the build material.

Alternatively, the build material and the containment material may be chosen to exhibit opposite vulnerabilities to the action of a solvent. For example, the containment material might be a polar material with the build material being a non-polar material. In this exemplary embodiment, the final composite structure may be immersed in a polar solvent that causes the polar containment material to dissolve away leaving only the build material.

In an additional embodiment, the build material may be curable upon exposure to radiation of a predetermined wavelength, while the containment material is not. After each quantity of build material is deposited, it may be exposed to radiation prior to the deposition of subsequent build material. So long as the cured material exhibits some interaction with identical material in the uncured state, the final composite structure will have differing hardness characteristics. Separation of the two components may then be accomplished by suitable physical or chemical means.

In yet another embodiment, the two materials may be chosen for their immiscibility with respect to one another. So long as the finished three-dimensional object does not contain topologically opposed components, it may be separated manually from the surrounding support material due to a lack of adhesion.

While the above-mentioned method has been explained in the context of a single material dispenser capable of selectively operating as either a high precision dispenser or as a low precision dispenser, the present method may be implemented in a solid free form fabrication device having any number of material dispensers wherein at least one dispenser is capable of operating as low precision dispenser and at least one dispenser is capable of operating as a high precision dispenser.

Alternative Embodiments

Figure 8:
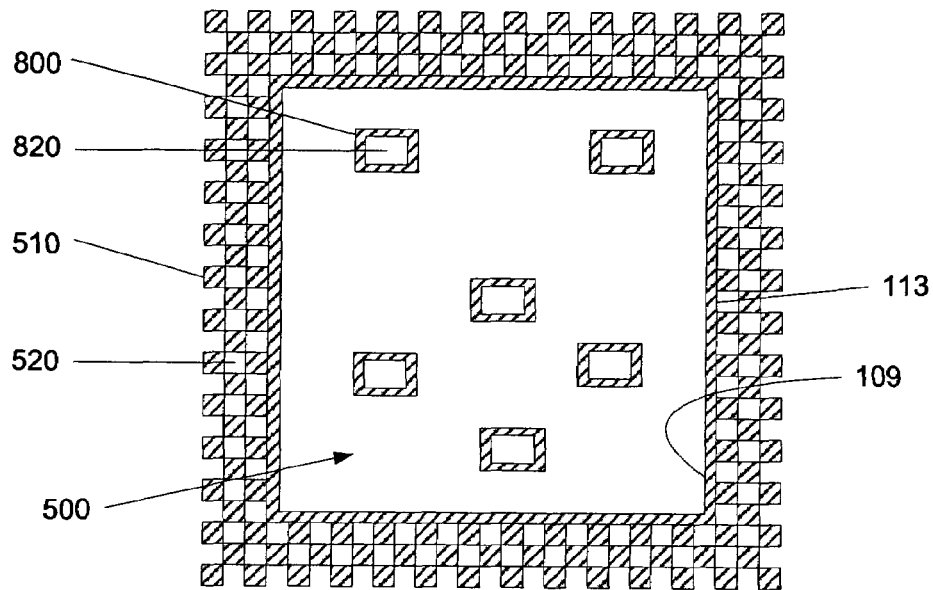
FIG. 8 is a top view of a build bin of the solid freeform fabrication system of FIG. 1 illustrating a containment structure with containment structure material interspersed with the object build material according to one exemplary embodiment.
Figure 9:
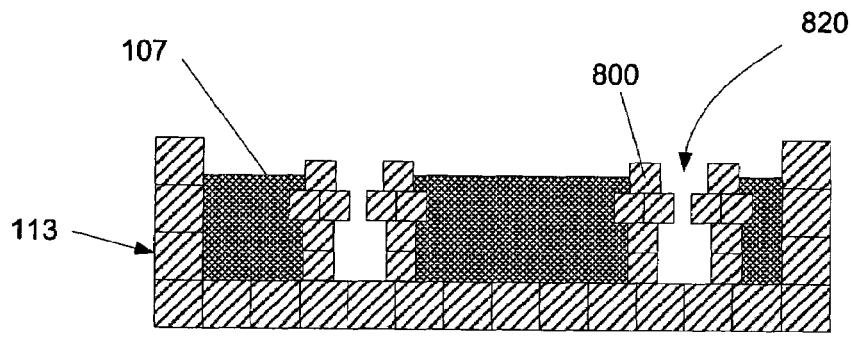
FIG. 9 is a side view of a build bin of a solid freeform fabrication system illustrating a containment structure and object build material having cavities formed therein according to one exemplary embodiment.

According to one alternative embodiment illustrated in FIG. 8, it may be desirable or cost effective to create cavities or porous networks within a desired three-dimensional object. The cavities (820) may be desirable to reduce weight, fabrication costs, or to address other issues. In order to produce cavities in the desired three-dimensional object, according to the present exemplary method, one or more cavities (820) may be built within the desired three-dimensional object by building smaller, hollow, containment structures (800) within the continuous object forming boundary (109) prior to dispensing the object build material (107; FIG. 9). As shown in FIG. 8, the smaller, hollow, containment structures (800) are formed having a solid outer wall similar to that of continuous object forming boundary (109) of the primary containment structure (113). According to this exemplary embodiment, the smaller, hollow, containment structures (800) may be formed by a material dispenser operating as a high precision dispenser either simultaneously with or in conjunction with, the forming of the continuous object forming boundary (109) of the primary containment structure (113).

FIG. 9 is a cross-sectional view of a containment structure including a primary containment structure (113) and a smaller, hollow containment structure (800). As shown in FIG. 9, when a cavity (820) is to be formed, the smaller, hollow, containment structure (800) may be formed prior to the dispensing of the build material (107). When the build material (107) is allowed to flow within the containment moat (500) formed by the containment structure (113), the smaller, hollow, containment structure (800) prevents the build material (107) from entering the desired cavity (820).

Figure 10:
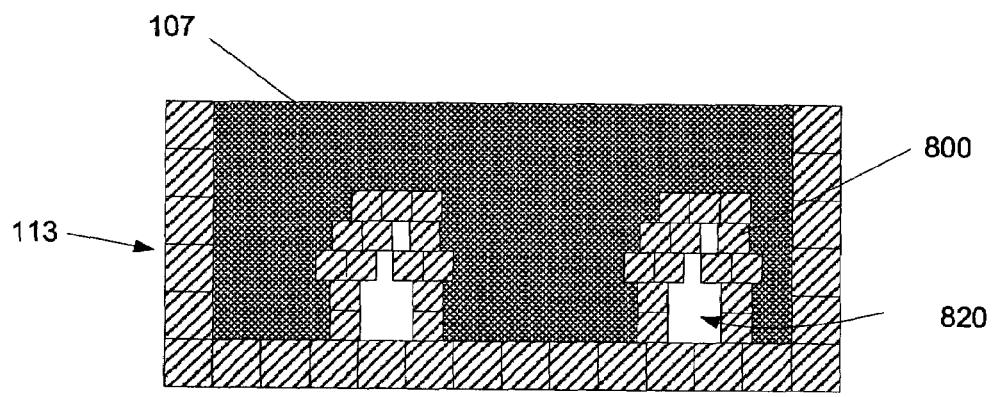
FIG. 10 is a side view of a build bin of a solid freeform fabrication system illustrating a containment structure and object build material having interconnected cavities according to one exemplary embodiment.

As shown in FIG. 10, once a cavity (820) has been formed in a desired three-dimensional object, subsequent structural material may be deposited such that drops at the edge of the cavity (820) partially overhang the edge of the cavity, and gradually seal off the cavity. As subsequent build material (107) is deposited in the containment moat (500; FIG. 8) formed by the containment structure (113), the structural material prevents build material from entering the formed cavity (820). This ability to form cavities within the desired three-dimensional object not only allows for a reduction in cost due to fabrication with less material, but a number of structural cavities such as honeycomb shaped cavities may be fabricated.

Figure 11:
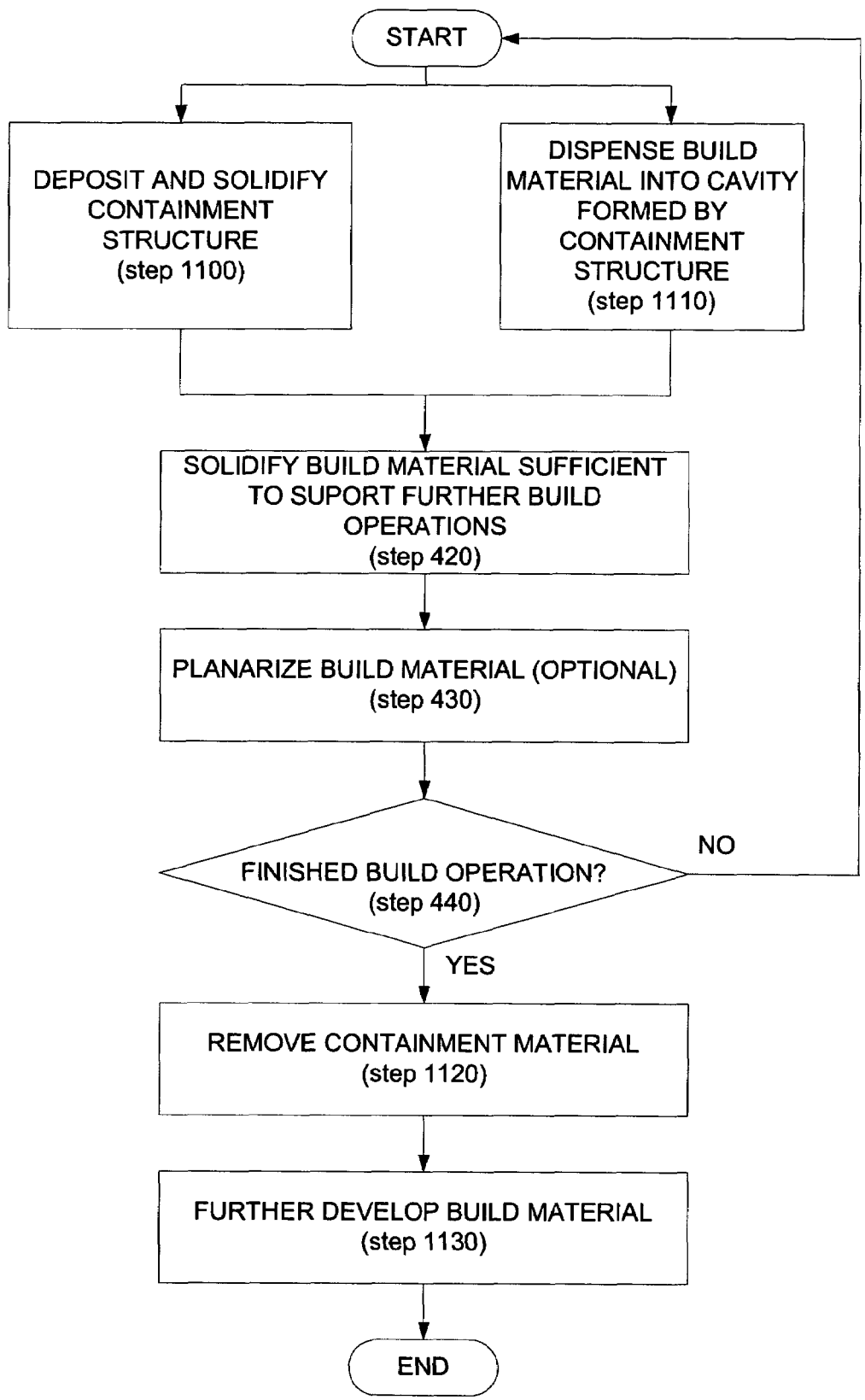
FIG. 11 is a flow chart illustrating a solid freeform fabrication method according to an alternative embodiment.

FIG. 11 illustrates an additional embodiment of the present solid freeform fabrication method. According to the exemplary embodiment illustrated in FIG. 11, the solid freeform fabrication method may begin by simultaneously forming the containment structure (step 1100) and dispensing the object build material (step 1110). The present method allows the continuous object forming boundary (109; FIG. 8) of the containment structure (113) to be formed with a material dispenser operating as a high precision dispenser while the build material is dispensed by a material dispenser operating as a low precision dispenser. If the bulk object build material (107) has a somewhat low viscosity and/or high surface tension, it may take some time to spread across and fill the containment moat (500; FIG. 8) defined by the containment structure (113; FIG. 8). According to this exemplary embodiment, the containment structure (113; FIG. 8) and the object build material (107; FIG. 9) may be dispensed simultaneously, as long as the containment structure is sufficiently solidified by the time the object build material (107) engages it. Once both the containment structure and the object build material have been dispensed, the build material may be solidified sufficiently to support further build operations (step 420). The build material may also be planarized to remove any excess build material (step 430). Once the build material is solidified and planarized, the computing device may determine whether the build operations are complete (step 440). If there are additional build operations to be performed, (NO, step 440), the solid freeform fabrication apparatus (100; FIG. 1) begins again to dispense containment structure and build materials. If, however, the computing device determines that the build operation is complete, it may cause the solid freeform fabrication apparatus (100; FIG. 1) to remove the containment material (step 1120) and to further develop the build material (step 1130). As show in FIG. 11, the removal of the containment material may occur prior to the final curing and development of the desired three-dimensional object if the process used to remove the containment material is benign enough to remove the containment material without damaging the desired three-dimensional object.

In conclusion, the present solid freeform fabrication system and method effectively reduce solid freeform fabrication costs by reducing the need for multiple high precision dispensers. More specifically, the present system and method permit the use of a material dispenser capable of operating as a high precision dispenser to selectively deposit the boundary area of a containment structure while using the same material dispenser, operating as a low precision dispenser, to deposit the remaining containment structure and to deposit build material. This system and method also reduces the cost of objects produced by allowing for sparse structural array configurations to be deposited by low precision dispensers reducing the amount of support material needed to build a desired three-dimensional object. The formation of sparse structural arrays also reduces the difficulty of removing the structural material due to the reduced quantity of material. Moreover, the present system and method reduces part defects by permitting the build material to remain in a flowable liquid state prior to subsequent solidification processes.

The preceding description has been presented only to illustrate and describe exemplary embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A method for producing an object through solid freeform fabrication comprising:
   selectively depositing containment material to form a boundary structure with a high precision dispenser;
   depositing a flowable object build material into said boundary structure with a low precision dispenser;
   solidifying said flowable object build material;
   removing said boundary structure from said object build material after said solidification of said object build material;
   wherein said removing said boundary structure comprises melting said boundary structure.

* * * * *